June 16, 1953     R. W. HEPT     2,642,505
DIRECTIONAL TURN INDICATOR
Filed Sept. 13, 1950     2 Sheets-Sheet 1
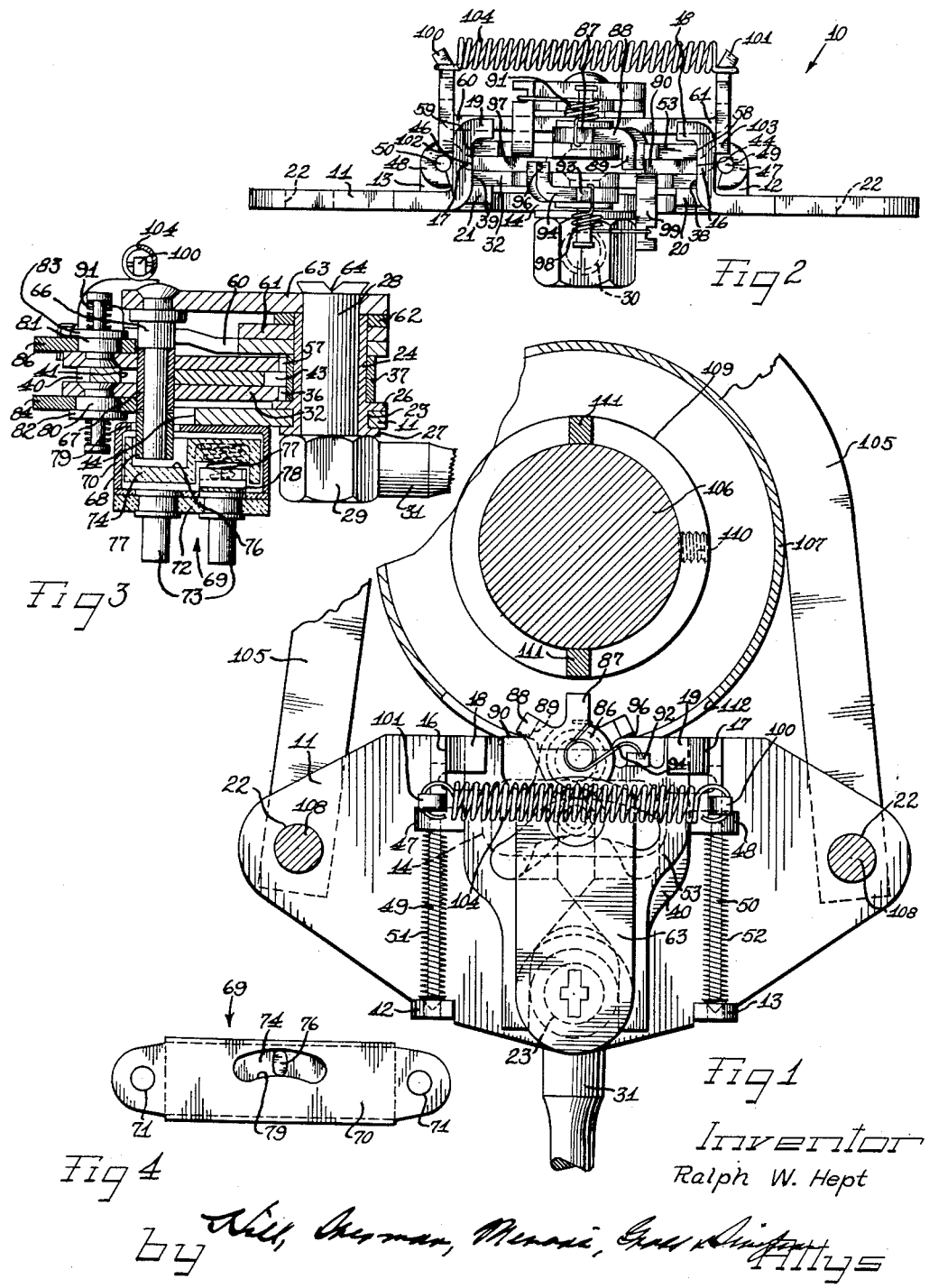
Inventor
Ralph W. Hept June 16, 1953 R. W. HEPT 2,642,505
DIRECTIONAL TURN INDICATOR
Filed Sept. 13, 1950 2 Sheets-Sheet 2
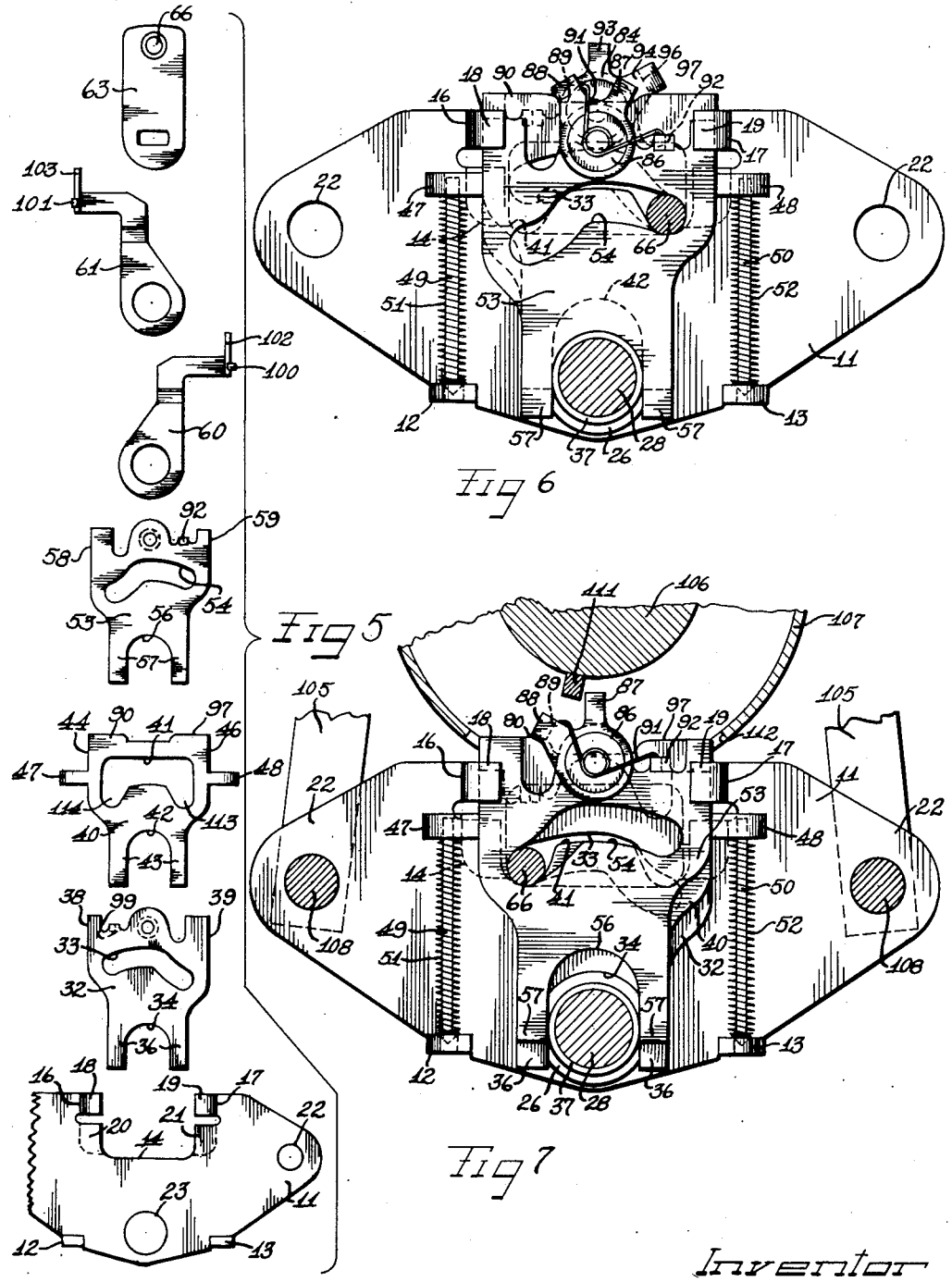
Inventor
Ralph W. Hept Patented June 16, 1953

2,642,505

UNITED STATES PATENT OFFICE 2,642,505

DIRECTIONAL TURN INDICATOR

Ralph W. Hept, Bronson, Mich., assignor to Kingston Products Corporation, Kokomo, Ind., a corporation of Indiana Application September 13, 1950, Serial No. 184,594

7 Claims. (Cl. 200—59)

This invention relates generally to an actuating mechanism for a multi-position switch and more particularly to a selectively actuatable switch mechanism adapted for use in a directional turn indicator system on a movable vehicle such as an automobile or the like.

According to the general features of the present invention, an electrical switch having sliding elements engaged by a cam pin carried by a drive arm is provided, the drive arm being angularly displaceable away from a central "off" position alternatively to a first turn indicating position and a second turn indicating position. The drive arm is normally spring biased towards the central "off" position by a pair of return arms which are resiliently connected by a return spring. Two reciprocable pawl carrier means taking the form of camming plates are provided and are slidable on an axis intersecting the steering post axis and normal thereto. A slidable latch plate is interposed between the two camming plates and is normally spring biased towards the steering post, however, a cam slot is provided therein to cooperate with a cam pin on the drive arm so that the latch plate is normally retained in an inactive position until one of the camming plates is driven reciprocably whereupon the latch plate will be moved forwardly into an active position. Each of the camming plates carries a pivotally mounted pawl having a pair of radially spaced spurs thereon. One of the spurs is adapted to engage the pawl striker carried by the steering post and the other spur is adapted to engage the latch plate to release same upon rotation of the steering post in a predetermined direction.

It is an object of the present invention, therefore, to provide an improved turn indicating signalling apparatus for an automotive vehicle or the like.

Another object of the present invention is to provide a turn indicating signalling apparatus wherein the operative elements are actuated under the influence of a resilient bias so that operation of the elements under abnormal conditions will not result in structural failures but will merely displace a resilient biasing spring.

A further object of this invention is to provide a compact switching assembly for a directional turn indicator which can be economically produced from simplified structural components.

Many other features, advantages and additional objects of the present invention will become manifest to those versed in the art upon making reference to the detailed description which follows and to the accompanying sheets of drawings in which a preferred embodiment of a directional turn indicator mechanism constructed in accordance with the principles of this invention is shown.

On the drawings:

Figure 1 is an enlarged plan view with parts broken away and with parts shown in cross-section showing a directional turn indicator according to the present invention mounted adjacent a steering post of an automotive vehicle or the like;

Figure 2 is an end elevational view of the actuating mechanism of a directional turn indicator according to the principles of the present invention;

Figure 3 is a cross-sectional view with parts broken away and with parts shown in elevation of an actuating mechanism together with a slide switch, all constructed in accordance with the principles of the present invention;

Figure 4 is a somewhat reduced plan elevational view of a slide switch provided by the present invention;

Figure 5 is an exploded view showing, in elevation, the details of construction of a number of the elements employed in the actuating mechanism of the directional turn indicator provided in accordance with the principles of the present invention;

Figure 6 is a plan view of the actuating mechanism of the present directional turn indicator with parts removed to indicate the arrangement of elements and showing the components of the actuating mechanism positioned in a first turn indicating relationship;

Figure 7 is a view somewhat similar to Figure 6, but showing, in addition, a broken away portion of a steering post and depicting the components of the actuating mechanism in a second turn indicating relationship.

As shown on the drawings:

A directional turn indicator is provided according to the present invention with an actuating mechanism indicated generally by the reference numeral 10 including a main bracket 11 which may be fabricated as a stamping and which comprises a generally flat plate-like element including a pair of spaced apart lugs 12 and 13, the utility of which will be made manifest presently.

One edge portion of the main bracket 11 is cut out as at 14 to provide an operating area for the remainder of the actuating mechanism about to be described. The cut out portion 14 is bounded on each side by upstanding lugs 16 and 17, respectively, each having an appropriately bent over flange 18 or 19 which lie in opposed registry and in spaced apart relationship from one another.

The edge portions of the cut out portion 14 inwardly adjacent the lugs 16 and 17 are upset as at 20 and 21, respectively so that the flange 18 and the upset portion 20 and the flange 19 together with the upset portion 21 form a pair of parallel guideways in which other slidable component elements of the actuating mechanism may be reciprocated. It will be understood that the main bracket may also be provided with a pair of mounting apertures 22 and a stud aperture 23.

As is most clearly seen in Figure 3, a hub 24 having an enlarged annular flange 26 is located in the aperture 23 in the main bracket 11 after which a securing flange 27 may be peened over to secure the hub 24 in firm assembly with the main bracket 11. Journaled within the hub 24 is a driving stud 28 having a hexed head 29 formed with a threaded bore 30 (Figure 2) to receive the end of an actuating handle 31 complementally threaded and adapted to be placed in firm assembly therewith.

Using the reference orientation of the drawings, the components of the actuating mechanism will be described by working up from the main bracket 11.

Adjacent the main bracket is situated a first pawl carrying means comprising a camming plate 32. As may be clearly seen in Figure 5, the camming plate 32 includes a somewhat complexly shaped camming slot 33 and is also recessed along one edge as at 34 so as to provide a pair of fingers 36 which straddle a drive roller 37 comprising a rotatable sleeve mounted on the hub 24. The respective edge portions 38 and 39 of the camming plate 32 slidingly engage the lugs 16 and 17, respectively and are restrained thereby together with the cooperation of the fingers 36 with the roller 37, so as to be guided along a reciprocatory path of movement.

Directly adjacent the camming plate 32 is a latch plate 40 having a symmetrically patterned internal camming slot 41 and having one external edge recessed as at 42 to provide a pair of fingers 43 adapted to straddle the roller 37. The edge portions 44 and 46 of the latch plate slidingly engage the lugs 16 and 17 respectively and together with the fingers 43 restrain the movement of the latch plate 40 along a reciprocatory path. A pair of ears 47 and 48 extend outwardly from the edge portions 44 and 46, respectively and are each shaped to define a recess, there being a spring guide pin 49 and a spring guide pin 50 located in the respective recesses and surrounded by a compression spring 51 and a compression spring 52 so that the ends of the springs 51 and 52 may be shouldered against the ears 47 and 48 and against the lugs 12 and 13 on the main bracket 11 thereby to continually spring bias the latch plate toward a forward position along its reciprocatory path.

It may be noted that the lugs 12 and 13 on the main bracket 11 may each be provided with an undersized aperture to seat an enlarged head portion formed on the end of each of the spring guide pins 49 and 50.

The next component of the actuating mechanism is the second pawl carrying means comprising the camming plate 53 which is generally similar to the camming plate 32 but in which a somewhat complexly shaped camming slot 54 is reversely arranged. The camming plate 53 has one edge recessed as at 56, thereby providing a pair of legs 57 to a straddle the roller 37 and is also provided with edge portions 58 and 59 which slidingly engage the lugs 16 and 17, respectively which engagement together with the cooperation between the legs 57 and the roller 37 operates to restrain the movement of the camming plate 53 along a reciprocatory path.

A first return arm 60 and a second return arm 61 are pivotally mounted on the hub 24. A spacing washer 62 is mounted on the hub 24 adjacent the return arm 61 and a driving arm 63 is firmly integrated with the driving stud 28 by peening over the end of the stud as at 64 (Figure 3).

As is clearly shown in Figure 3, the driving arm 63 has firmly assembled on one end thereof a camming pin 66 formed with a reduced diameter portion to receive a rotatable sleeve or collar 67 which is retained thereon by a press fit retaining collar 68. The camming pin 66 extends between the return arms 60 and 61 and through the camming slots 54, 41 and 33 of the camming plate 53, the latch plate 40 and the camming plate 32, respectively. The camming pin 66 also extends through the cut out portion 14 of the main bracket 11 and the end thereof is received by a slider type switch indicated generally by the reference numeral 69.

The slider switch 69 includes a metal bracket-type housing 70 having a pair of mounting apertures 71 adapted to coincide with the mounting apertures 22, formed in the main bracket 11. A contact plate 72 made of a suitable non-conductive material is carried by the housing 70 and includes a plurality of conductor receiving contacts 73 in firm assembly therewith. A slider 74 made of insulating material is slidably carried in the housing 70 and is provided with a slot 76 to receive the end of the camming pin 66. The slider 74 is further provided with spaced apart recesses each bottoming a spring 77 adapted to resiliently urge one of a plurality of contacts 78 into cooperative relationship with one of the contacts 73. The housing 70 is provided with an arcuate slot 79 so that the camming pin 66 may operate to move the slider 74 reciprocably and move the contacts 78 relatively to the contacts 73.

As noted, each of the camming plates 32 and 53 also serves as a pawl carrying means and to that end, each of the camming plates 32 and 53 is provided with a suitable aperture adjacent one edge thereof to receive a pawl stud 80 or 81, respectively. A medial flange 82 or 83 is provided on the respective pawl studs 80 and 81 and a first pawl 84 and a second pawl 86 are pivotally mounted on the studs and between the medial flanges 82 and 83 and the respective camming plates 32 and 53.

Each of the pawls 84 and 86 is particularly characterized by the provision of a pair of radially spaced spurs. On Figure 1, the pawl 86 is clearly shown as including a first spur 87 which may be referred to as a striker spur and a second spur 88 which is angularly spaced from the first spur 87 and has a bent over tongue 89 on the end thereof adapted to engage the latch plate 40 at a tongue engaging surface 90 along the forward edge of the latch plate 40.

It will be noted that the portion of the pawl stud 81 extending above the medial flange 83 is surrounded by a pawl spring 91. One end of the pawl spring 91 is hooked behind the spur 87 and the other end of the pawl spring 91, which may be in the form of a small torsion spring, is hooked behind a lug 92 formed integral with the pawl carrying means or camming plate 53. Thus, the pawl 86 will normally be biased rotatably in one direction.

As is most clearly shown in Figures 2 and 6, the pawl 84 is likewise provided with a first spur 93 and a second spur 94 having a tongue 96 arranged to engage a tongue engaging surface 97 on the latch plate 40. A torsion spring 98 is carried by the pawl stud 80 and has one end thereof hooked behind the spur 93 and the other end hooked behind a lug 99 formed integrally with the pawl carrying means or camming plate 32.

On Figure 5 it will be noted that each of the return arms 60 and 61 is provided with a dog leg-shaped body portion apertured to receive the driver stud 28 and the hub 24 and a bent over portion is formed on the end thereof having an upstanding lug 100 or 101, respectively, and a depending lug 102 or 103, respectively, each adapted to engage the lug 16 or 17 on the main bracket 11. A return spring 104 is used to interconnect the upstanding lugs 100 and 101, thereby tending to draw the return arms 60 and 61 together into abutment with the lugs 16 and 17.

The return arms 60 and 61 engage opposite sides of the camming pin 66 so as to normally spring bias the camming pin 66 as well as the driving arm 63 to a center position which corresponds to a neutral or off position insofar as the switch 69 and the rest of the actuating mechanism is concerned.

As will be noted on Figures 1 and 7, the directional turn indicator 10 may be mounted adjacent a steering post 106 surrounded by a tubular shroud 107, for example, by mounting same with a suitable support means including connecting fasteners 108 which pass through the mounting apertures 22 in the main bracket 11 and the aperture 71 formed in the switch body 70 and into a simple bracket 105. Any well known form of striker device may be employed on the steering post 106, for example, a pawl striker 109 may be provided comprising a ring held in firm assembly with the steering post by a set of screws 110 and having a pair of pawl engaging legs 111—111 arranged in spaced apart relationship with respect to one another.

In this particular embodiment, the shroud 107 is provided with an aperture 112 through which components of the actuating mechanism are adapted to extend for selective engagement with the legs 111 of the pawl striker 109.

Operation

The functional relationship of all of the component elements will be understood from a brief description of the operation of the directional turn indicator actuating mechanism 10. The operational steps may be best understood by referring to Figures 1, 6 and 7.

In Figure 1 all of the components of the actuating mechanism are shown positioned in an "off" or neutral relationship. Thus, each of the reciprocable camming plates 32 and 53 as well as the latch plate 40 are in retracted position and the return arms 60 and 61 lie with the lugs 102 and 103 engaging the lugs 16 and 17 of the main bracket 11. Each of the pawls 84 and 86 is biased in an opposite direction so that both of the spurs 87 and 93 extend directly toward the steering post 106 while the tongues 89 and 96 engagingly abut the tongue surfaces 90 and 97 of the latch plate 40.

The driving stud 28 may be alternatively rotated thereby carrying the driving arm 63 to the left or to the right through an angular displacement. When moved to a first turn indicating position (Figure 6) the camming pin 66 engages the sides of the camming slot 33 in the camming plate 32 and drives the camming plate 32 forwardly in its reciprocatory path, thereby carrying the pawl 84 into actuating registry with the legs 111 of the pawl striker 109.

Since the latch plate 40 is under continuous spring bias furnished by the compression springs 51 and 52 operating between the lugs 12 and 13 on the main bracket 11 and the ears 47 and 48 extending outwardly from the edges 44 and 46 of the latch plate 40, as soon as the camming pin 66 is displaced away from center, the enlarged side portions of the camming slot 41 formed in the latch plate 40 provide a recess so that the latch plate 40 will also be driven forward along its reciprocatory path, the tongue engaging surface 97 thereof engagingly abutting the tongue 96 of the pawl 84.

In this first turn indicating position, the camming plate 53 will remain relatively inactive, however, it will be noted that the edge portion of the latch plate 40 between the tongue engaging surfaces 90 and 97 is slightly relieved so that forward movement of the latch plate 40 will ease the pawl 86 to a slightly displaced position where inadvertent actuation of same will be precluded.

In the position thus assumed, the camming pin 66 will nest in a recess 113 formed as a part of the camming slot 41 in the latch plate 40 and will be retained by the latch plate in angularly displaced relationship under a positive latching action. The recess 113 actually forms a limited guideway disposed in the direction of reciprocation of the latch plate 40, so that movement of the latch plate 40 will locate the camming pin 66 in the recess 113 in such a position as to preclude further pivotal movement of the camming pin 66. A manual reset may be accomplished, however, merely by manually shifting the handle 31 whereupon the camming pin 66 will ride up in the camming slot 41 back to a center position.

Using the orientation of Figure 6, it will be noted that engagement of the spur 93 with the legs 111 should the steering post 106 be turning in a clockwise direction will merely displace the pivotally mounted pawl 84 against the compression of the torsion spring 98, however, if the steering post 106 is rotated counterclockwise, as would occur, for example, upon the completion of an executed turn in the direction of the turn indicated in a signalling system energized through the switch 69, the spur 93 and the pawl 84 will be rotated clockwise so that the tongue 96 will positively force the latching plate 40 backwards through engagement with the tongue engaging surface 97, whereupon the camming pin 66 will be moved out of the recess 113.

It will be apparent that upon initial movement of the actuating mechanism 10 to the position shown in Figure 6, the return arm 60 will be displaced by direct contact engagement with the camming pin 66 against the spring bias of the return spring 104. Therefore, when the camming pin 66 is moved out of the recess 113 in the latch plate 40, the return arm 60 under the bias of the return spring 104 will move the driver arm 63 back to a neutral or "off" position, the camming pin 66 simultaneously driving the camming plate 32 back to a retracted position.

In Figure 7 a second turn indicating position is depicted in the arrangement of the component elements of the actuating mechanism 10. In this view, the driving arm 63 has been angularly displaced in an opposite direction so that the camming pin 66 moving through the camming slot 54 of the camming plate 53 reciprocates same forwardly carrying the spurs 87 and 88 of the pawl 86 into actuating registry with the legs 111 of the pawl striker 109. The camming slot 41 of the latch plate 40 also provides a clearance or guideway in the direction of movement of the latch plate 40 so that the latch plate 40 will be driven forwardly by the compression springs 51 and 52 until the camming pin 66 is snugly received in a recess 114 formed in the latch plate 40 as a part of the camming slot 41.

In this position, counterclockwise rotation of the steering post 106 will merely rotatably displace the pawl 86 against the compression of the torsion spring 91, however, clockwise rotation of the steering post 106 will drive the legs 111 of the pawl striker 109 into engagement with the spur 87 of the lug 86 whereupon the tongue 89 formed on the end of the spur 88 will engage the tongue engaging surface 90 of the latch plate 40 to move the latch plate 40 rearwardly on its reciprocatory path.

In this manner, the camming pin 66 may move out of the recess 114 and the entire actuating mechanism will be restored to a neutral position through the action of the return arm 61 under the influence of the spring bias exerted by the return spring 104.

It will be understood, of course, that as the camming pin 66 is moved from or to one or the other of its three respective fixed positions, the slider 74 of the switch 69 will also be moved into a corresponding circuit opening or closing position, the contacts 73 being selectively bridged to establish proper circuit relationship for a conventional turn indicating signalling system used on automotive vehicles and the like.

Although I have resorted to detail in the description of the preferred structural embodiment provided in accordance with the principles of my invention, it should be understood that I wish to embody within the scope of this patent all such modifications as reasonably and properly come within the scope of my contribution to the art.

I claim as my invention:

1. In a directional turn indicator switching mechanism cooperable with a steering post having pawl striking means thereon, a frame having means to support the same adjacent the steering post, a plurality of superimposed reciprocable sliding plates mounted on said frame for movement toward and away from the steering post, a pair of said plurality of plates comprising first and second pawl carrying camming plates each having a complexly shaped camming slot therein, a third plate of said plurality of plates comprising a latch plate and having a symmetrically arranged camming slot therein with recessed portions at the opposite ends thereof extending in the direction of reciprocation of said plates, said latch plate being interposed between said camming plates, a driving arm pivotally mounted on said frame and having a camming pin extending through all of said plates and cooperable with each of said camming slots, resilient means normally biasing said driving arm towards a center neutral position, resilient means normally biasing said latch plate toward said steering post, pawl means carried by each of said camming plates, each of said pawl means having a latch plate engaging portion, and means to selectively angularly displace said driving arm in alternative direction, whereby actuation in either direction will cam one of said camming plates together with its pawl means into actuating registry with the steering post, said camming pin being engageable in one of said recessed portions of said camming slot of said latch plate, whereby said latch plate will be biased toward said steering post to seat said camming pin in said recess, said engaging portion of said one pawl means operable upon actuation in a predetermined direction to urge said latch plate away from said steering post, thereby to release said camming pin from said one of said recessed portions of said latch plate, whereupon all of said plates will be restored to neutral position.

2. In an actuating mechanism for a directional turn indicator switching mechanism, the improvement of reciprocatorily slidable latch plate having a camming slot therein, said camming slot being formed with an enlarged recess portion at each end thereof extending generally in the direction of reciprocation of said latch plate, means normally biasing said latch plate in one direction, a camming pin extending through said camming slot and operable to normally retain said plate in retracted position, a pawl carrying means and switch means cooperable with said latch plate and actuatable by said camming pin, said camming pin being selectively movable into either of said recessed portions, whereupon said plate will be reciprocated in said one direction and said camming pin will be retained in said recess, said pawl carrying means including elements to move said latch plate against said bias upon selective actuation thereof, whereupon said camming pin will be unseated from said recess.

3. In a directional turn indicator switching mechanism to be actuated by a pawl engaging means carried by a steering post, a frame adapted to be connected adjacent a steering post, a switch connected to said frame and having reciprocatorily slidable contact carrying means, a driving arm pivotally mounted on said frame, a pin on the end of said arm engageable with said contact carrying means and arranged to drive same along a reciprocatory path, means to angularly shift said driving arm in alternative direction, whereby said contact carrying means will be alternatively shifted along a reciprocatory path, and means to retain said driving arm in angularly shifted position, said means comprising a reciprocable latch plate slidably mounted on said frame and having a slot formed therein to receive said pin, said slot having spaced apart enlarged recessed portions extending generally in the direction of reciprocation of the plate and resilient means normally biasing said plate in one direction, whereupon angular displacement of said driving arm will seat said pin in one of said recessed portions to yieldably retain said driving arm in angularly shifted position.

4. In a directional turn indicator switching mechanism to be actuated by a pawl engaging means carried by a steering post, a frame adapted to be connected adjacent a steering post, a switch connected to said frame and having reciprocatorily slidable contact carrying means, a driving arm pivotally mounted on said frame, a pin on the end of said arm engageable with said contact carrying means and arranged to drive same along a reciprocatory path, means to angularly shift said driving arm in alternative direction, whereby said contact carrying means will be alternatively shifted along a reciprocatory path, means to retain said driving arm in angularly shifted position, said means comprising a reciprocable latch plate slidably mounted on said frame and having a slot formed therein to receive said pin, said slot having spaced apart enlarged recessed portions extending generally in the direction of reciprocation of the plate and resilient means normally biasing said plate in one direction, whereupon angular displacement of said driving arm will seat said pin in one of said recessed portions to yieldably retain said driving arm in angularly shifted position, and resilient means normally biasing said driving arm, whereby said arm will be driven to a neutral position whenever said pin is out of one of said recessed portions.

5. In a directional turn indicator switching mechanism to be actuated by a pawl engaging means carried by a steering post, a frame adapted to be connected adjacent a steering post, a switch connected to said frame and having reciprocatorily slidable contact carrying means, a driving arm pivotally mounted on said frame, a pin on the end of said arm engageable with said contact carrying means and arranged to drive same along a reciprocatory path, means to angularly shift said driving arm in alternative direction, whereby said contact carrying means will be alternatively shifted along a reciprocatory path, means to retain said driving arm in angularly shifted position, said means comprising a reciprocable latch plate slidably mounted on said frame and having a slot formed therein to receive said pin, said slot having spaced apart enlarged recessed portions extending generally in the direction of reciprocation of the plate and resilient means normally biasing said plate in one direction, whereupon angular displacement of said driving arm will seat said pin in one of said recessed portions to yieldably retain said driving arm in angularly shifted position, resilient means normally biasing said driving arm, whereby said arm will be driven to a neutral position whenever said pin is out of one of said recessed portions, and slidable pawl carrying means on each side of said latch plate including rotatable elements movable into actuating registry with the steering post whenever said driving arm is angularly shifted and having extending portions arranged to drivingly engage said latch plate whenever said elements are rotated in a predetermined direction to release said latch plate.

6. In a directional turn indicator switching mechanism to be actuated by a pawl engaging means carried by a steering post, a frame adapted to be connected adjacent a steering post, an integral switch sub-assembly comprising a slider switch having a bracket type housing provided with mounting means for mounting said switch sub-assembly on said frame, a contact plate in said housing and having fixed contact members thereon, a slider made of insulating material and disposed in said housing for relative reciprocable movement therein, contact members on said slider selectively engaging said fixed contact members upon movement of said slider in said housing, a driving arm pivotally mounted on said frame, a pin on the end of said arm engaging said slider and arranged to drive same along a reciprocatory path in said housing upon pivotal displacement of said driving arm, and means angularly shifting said driving arm in alternative direction for alternatively shifting said slider along a reciprocatory path and controlling said contact members.

7. In a directional turn indicator switching mechanism as defined in claim 6, said slider having a recess formed therein to receive the end of said pin and said housing having an arcuate slot passing said pin whereby the slider may be moved reciprocably upon pivotal movement of said driving arm.

RALPH W. HEPT.

References Cited in the file of this patent

UNITED STATES PATENTS

| Number | Name | Date |
|---|---|---|
| 2,226,140 | Rhiner | Dec. 24, 1940 |
| 2,275,796 | Nacker et al. | Mar. 10, 1942 |
| 2,291,141 | Breeze | July 28, 1942 |